(No Model.) 6 Sheets—Sheet 1.

H. A. HENDERSON.
HEEL NAILING MACHINE.

No. 316,894. Patented Apr. 28, 1885.

WITNESSES
Bowdoin S. Parker.
Willard L. Fogg

INVENTOR
Henry A. Henderson
by his atty
Clarke & Raymond (No Model.)

H. A. HENDERSON.
HEEL NAILING MACHINE.

No. 316,894.  Patented Apr. 28, 1885.

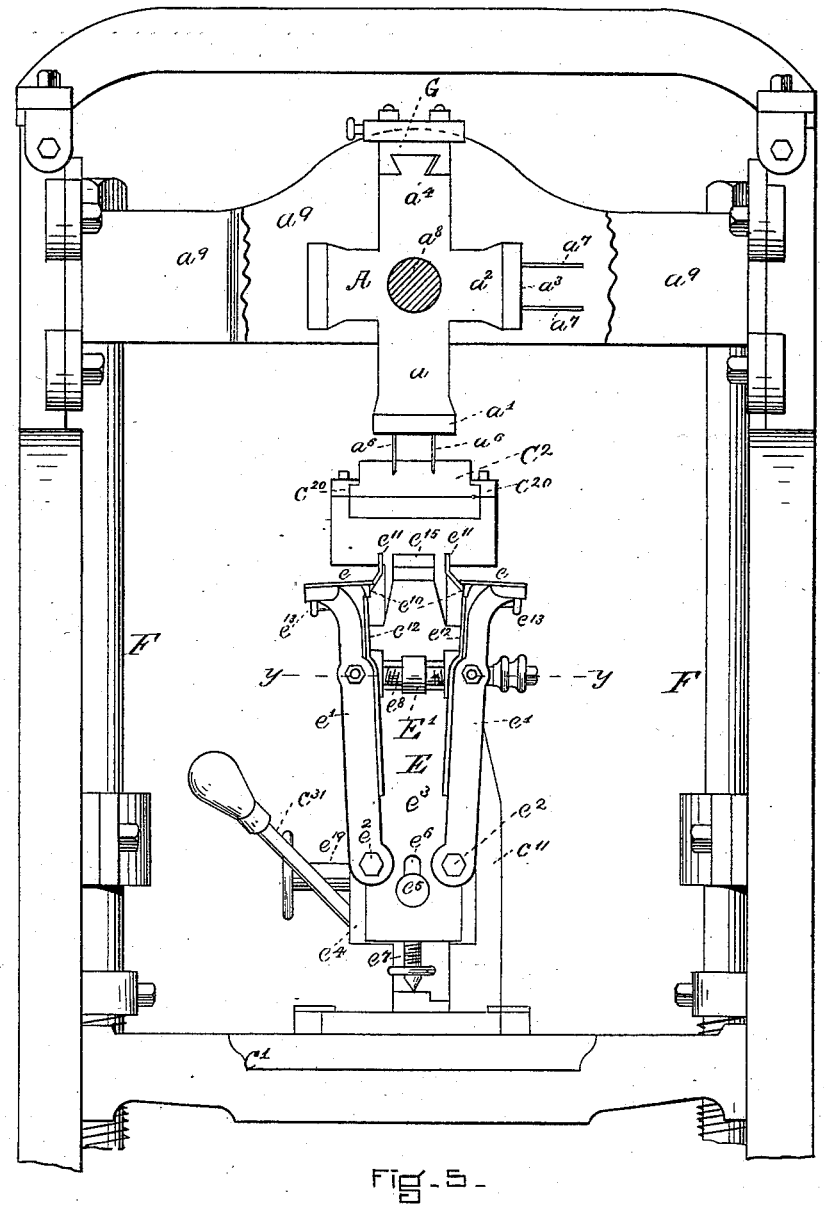

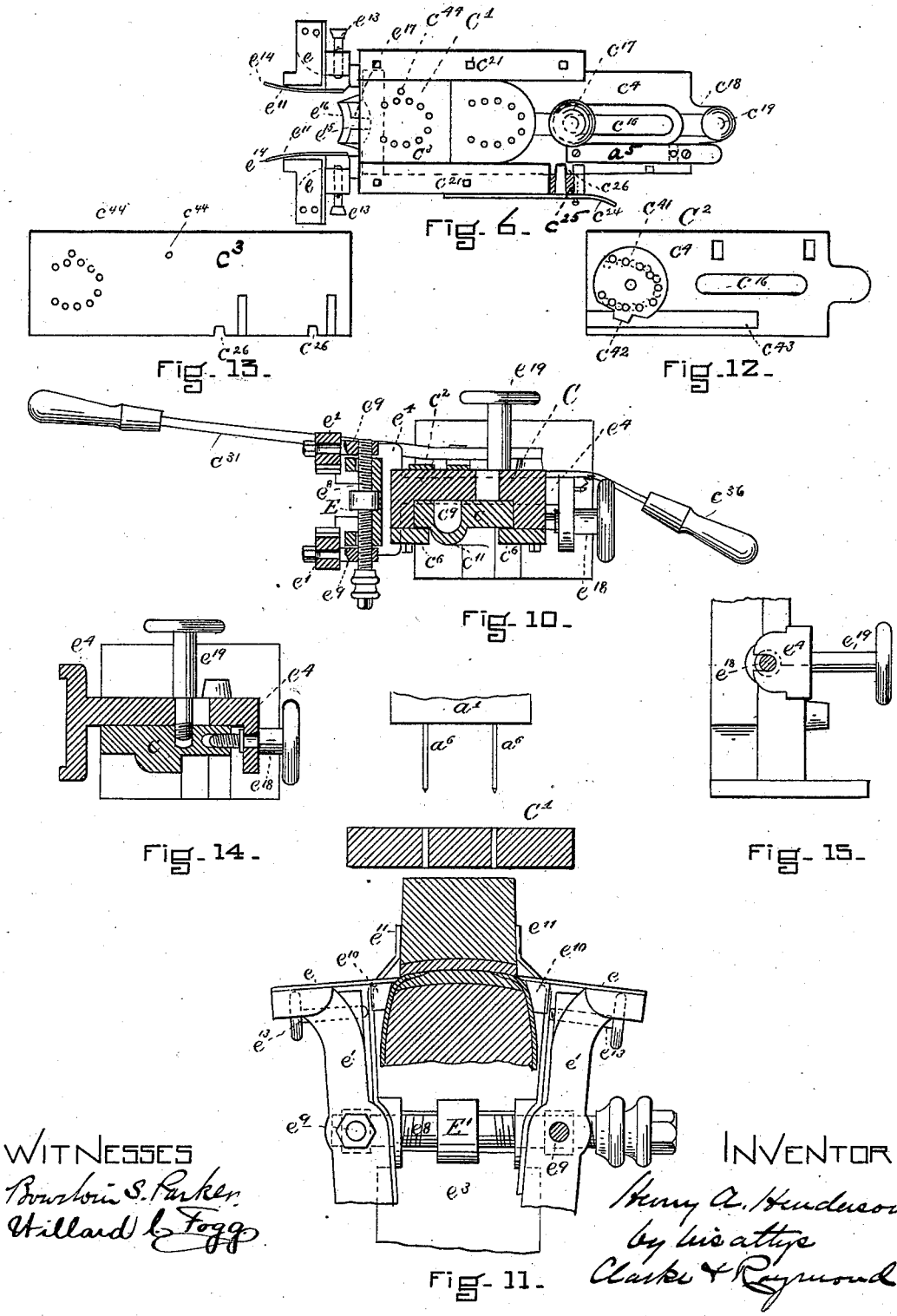

(No Model.) 6 Sheets—Sheet 5.
H. A. HENDERSON.
HEEL NAILING MACHINE.
No. 316,894. Patented Apr. 28, 1885.
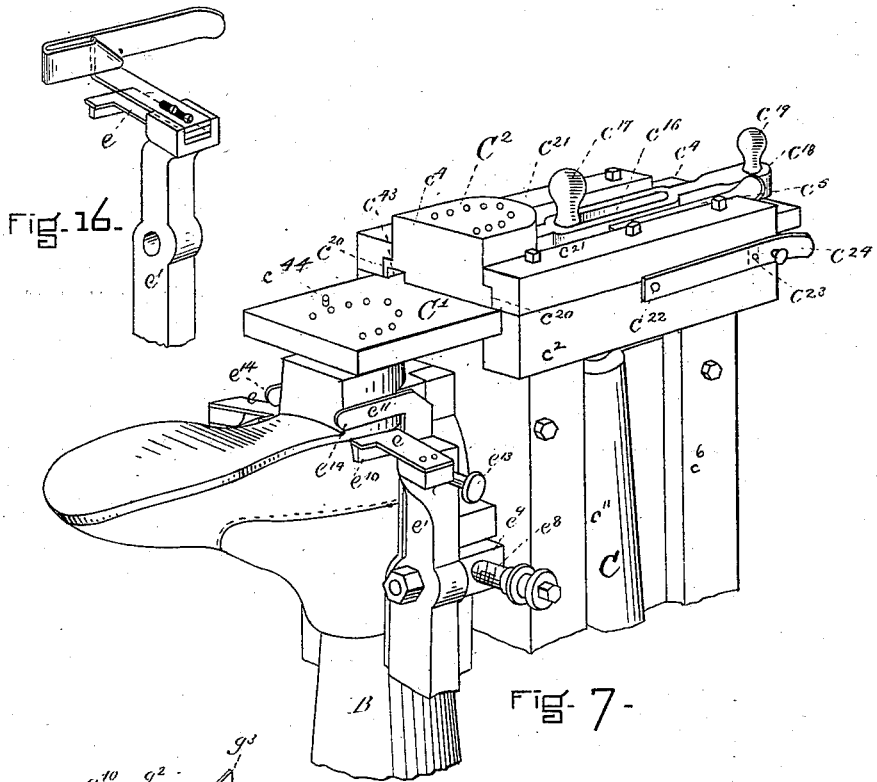
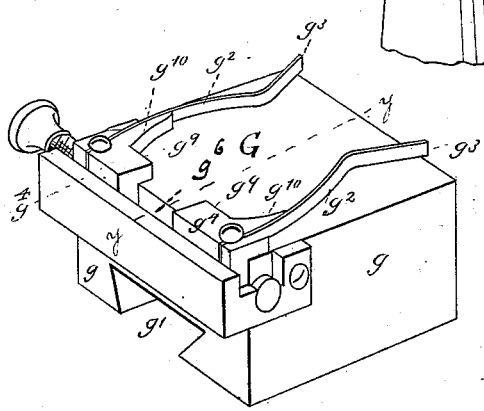
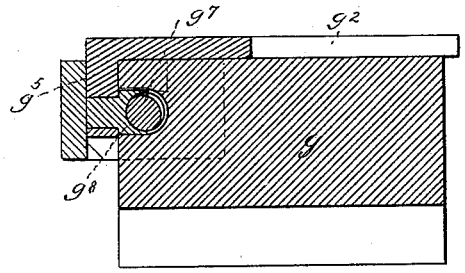
WITNESSES
INVENTOR (No Model.)

6 Sheets—Sheet 6.

H. A. HENDERSON.
HEEL NAILING MACHINE.

No. 316,894.  Patented Apr. 28, 1885.

WITNESSES
Bowdoin S. Parker
Willard C. Fogg

INVENTOR
Henry A. Henderson
by his attys
Clark & Raymond

UNITED STATES PATENT OFFICE.

HENRY A. HENDERSON, OF LYNN, ASSIGNOR TO F. F. RAYMOND, 2D, TRUSTEE, OF NEWTON, MASSACHUSETTS.

HEEL-NAILING MACHINE.

SPECIFICATION forming part of Letters Patent No. 316,894, dated April 28, 1885.

Application filed January 10, 1883. (No model.)

*To all whom it may concern:*

Be it known that I, HENRY A. HENDERSON, of Lynn, in the county of Essex and State of Massachusetts, a citizen of the United States, have invented a certain new and useful Improvement in Heel-Nailing Machines, of which the following is a full, clear, and exact description, reference being had to the accompanying drawings, forming a part of this specification, in explaining its nature, in which—

Figure 1:
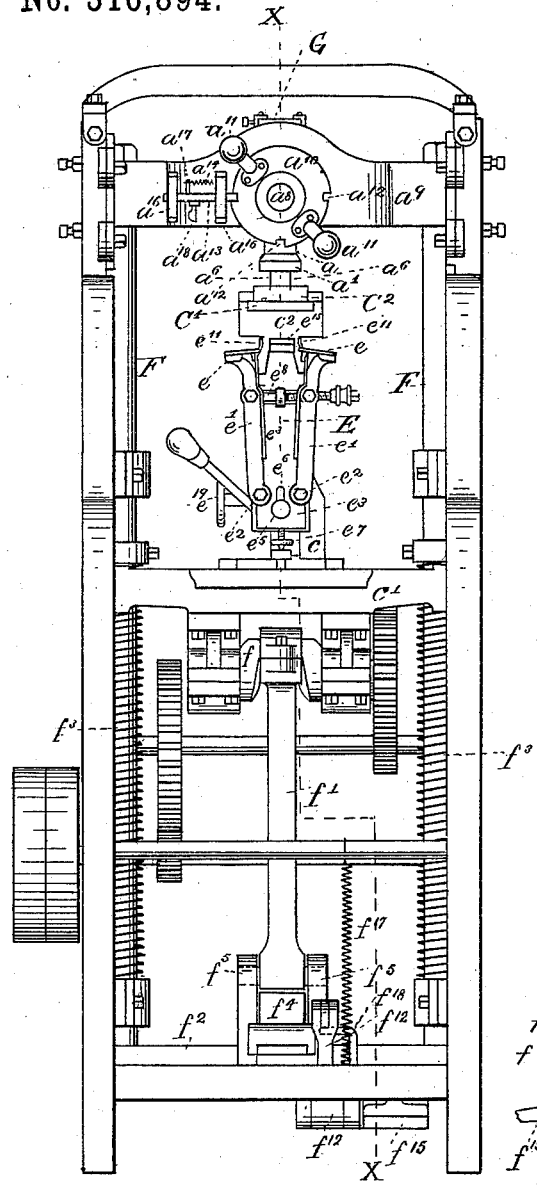
Figure 2:
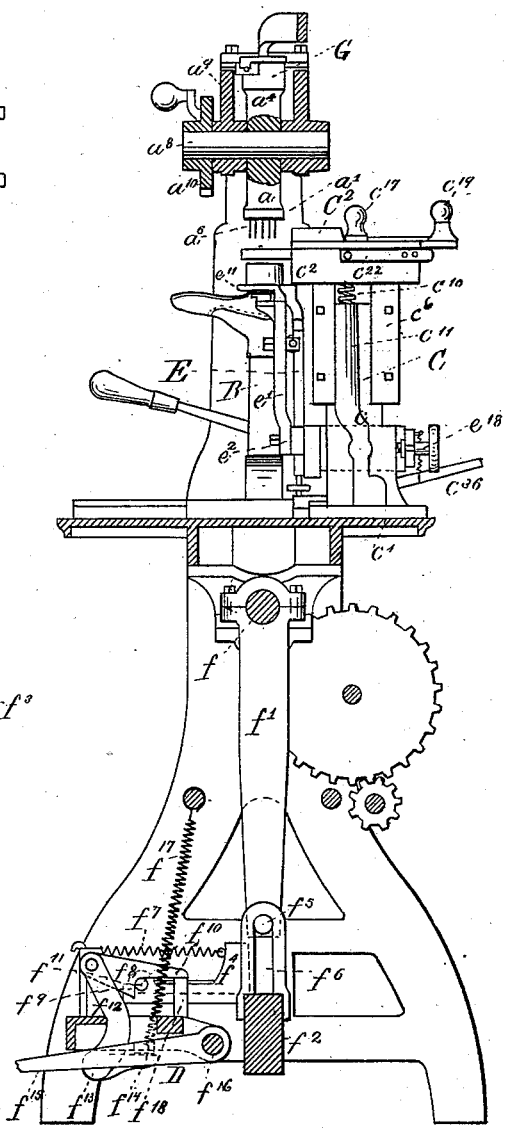
Figure 3:
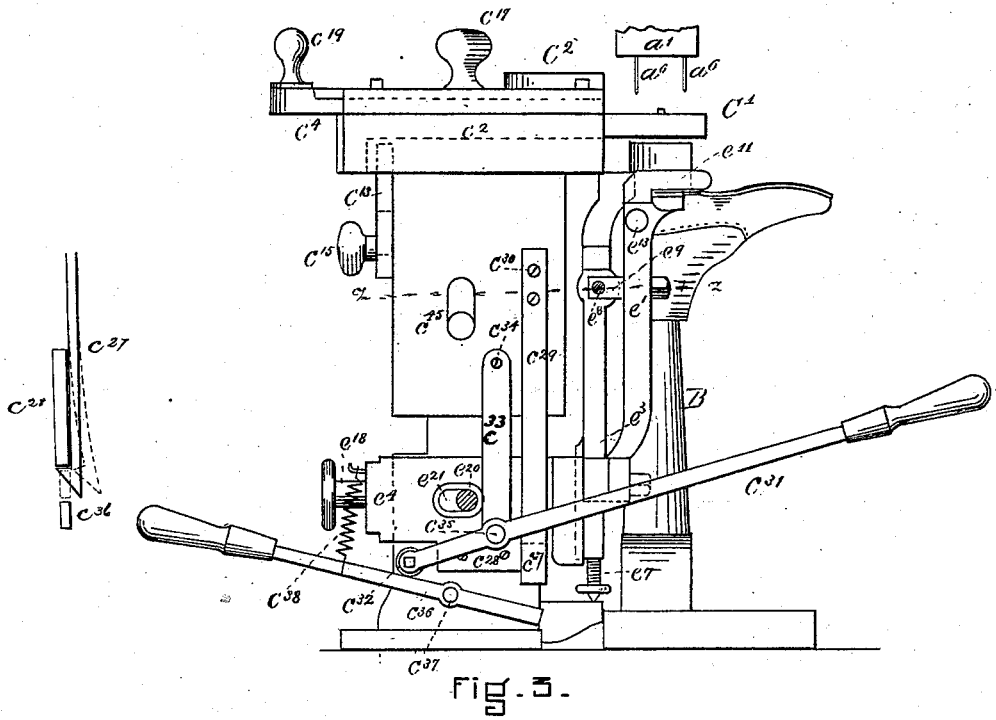
Figure 4:
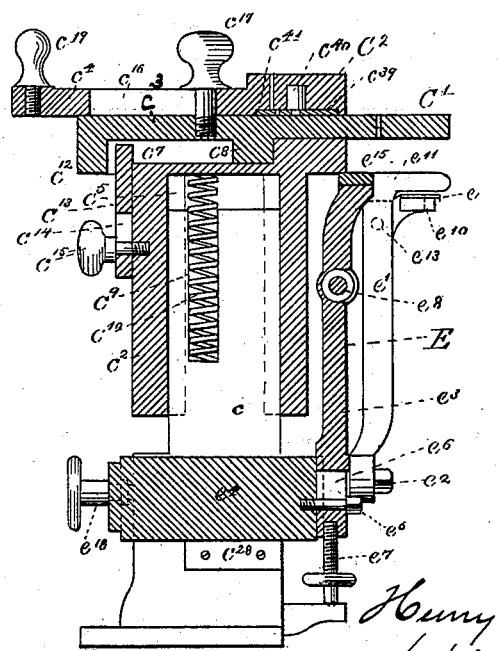
Figure 17:
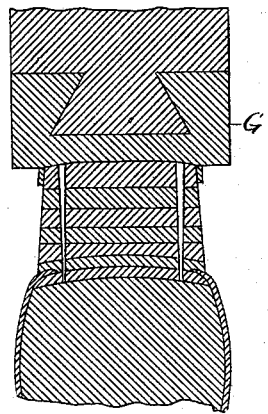
Figure 18:
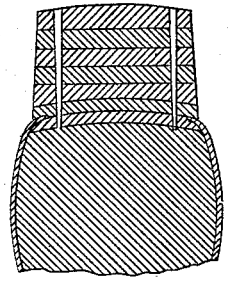

Figure 1 is a front elevation of my improved machine. Fig. 2 is a vertical section on the line $xx$ of Fig. 1, with certain parts broken out, and the portions beyond in elevation representing the construction. Fig. 3 is an enlarged view, representing in elevation the stand, centering devices, jack, and a portion of the awl-holding block and awls upon the side opposite that shown in Fig. 2. Fig. 4 is a vertical central section of the stand and centering devices. Fig. 5 is an enlarged view, in front elevation, of the stand, centering devices, and head, a portion of the frame and head being broken out to represent more fully the construction. Fig. 6 is a plan view of the stand and centering devices, enlarged. Fig. 7 is a perspective view of a portion of the stand, heel-centering devices, and jack. Fig. 8 is a perspective view of the top-lift-holding device, enlarged. Fig. 9 is a vertical section upon the line $y\ y$ of Fig. 8. Fig. 10 is a horizontal section of the stand and centering devices on the line $z\ z$ of Fig. 3, looking downward. Fig. 11 is a view of a portion of the centering devices in elevation, and of a portion of the jack, shoe, heel, and templet-plate in section, and the drivers in position above the templet-plate. Fig. 12 is a plan view, reversed, of the nail-holder and a turn-table plate, which is hereinafter more fully described. Fig. 13 is a plan view of the templet-plate. Fig. 14 is a horizontal section of the lower portion of the stand. Fig. 15 is a view in elevation of a portion of the back of the stand. Fig. 16 is a detail view in perspective of a modification hereinafter described. Fig. 17 is a vertical section showing the top-lift spanker, the heel-blank, and a portion of the boot or shoe. Fig. 18 represents in section the heel-blank after the top lift has been spanked on.

The invention is an improvement upon that described in my Letters Patent No. 252,215, dated January 10, 1882, and No. 259,687, dated June 20, 1882, and it relates, principally, to details in construction whereby the efficiency and durability of the machine are increased.

Referring to the drawings, A represents the head of the machine, or that portion which carries or supports the awls, drivers, and top-lift-holding devices, or either of them.

B represents the jack, and C represents the stand. The stand is mainly used for supporting the table which carries or supports the templet and nail-holder, and for convenience and economy of construction.

I have represented the shoe and heel centering and adjusting devices E as fastened to the stand; but while this is desirable it is not essential, because these appliances may be supported upon a separate plate-arm or bracket which shall have the adjustments herein indicated as being desirable.

The head A may have as many arms or portions for supporting the awl-holding, nail-holding, and top lift-holding blocks as may be desired. For instance, it may be desirable to use one gang or group of awls, one gang or group of drivers, and a top-lift spanker and holder, as represented in the drawings, in which case I prefer the arrangement of arms represented in Fig. 5 of the awls opposite or under the top-lift spanker and holder, with the drivers projecting at right angles thereto, in order that the successive movements which bring the awls, drivers, and top-lift spanker and holder each into place may be made by a quarter-revolution of the head; and while this is an advantage when the three blocks are used, as it enables the rapid bringing into position of the awls, drivers, and top-lift spanker and holder, and the subsequent return thereof to their original position when speed of movement is not so necessary, yet, of course, they may be arranged to bear any other relation to each other desirable; and in lieu of three arms I may have one for supporting the awls or drivers simply, in which case it would not be necessary to provide the head with revolution; or I may have an arm for supporting the awls and one for the drivers, in which case the head should be arranged to be revolved; or I can have four arms, two of which may support awls, and two drivers, so that two rows of nails may be driven in one heel; or I may have five arms, two arms for supporting groups of awls, two for groups of drivers, and an additional arm for supporting and carrying the top-lift spanker and holder.

In the drawings, $a$ represents the arm supporting the awl-holding block $a^1$, $a^2$ the arm supporting the driver-holding block $a^3$, and $a^4$ the arm carrying the top-lift holding and spanking block. $a^6$ are the awls; $a^7$, the drivers.

The head A is keyed to the shaft $a^8$, which has bearings upon either side of the head in the cross-plates or yoke $a^9$, and to the front end of the shaft is secured the register wheel or disk $a^{10}$, which has the handles $a^{11}$ and the notches $a^{12}$. (Best shown in Fig. 1.) A sliding bolt, $a^{13}$, is fastened to the cross piece or plate $a^9$ by the supporting-pieces $a^{16}$, riveted or bolted to the plate, and it is kept in contact with the edge of the register-disk by means of a spring, $a^{17}$; and a thumb piece or knob, $a^{18}$, serves to move the catch horizontally and disengage it from the notch. The awl and nail-holding blocks and top-lift holding and spanking block are removable from their respective supporting arms, in order that others for different sizes and shapes of heels may be substituted. The top-lift holder is adjustable to a number of sizes, so that its block does not require to be removed more than once for a large range of sizes.

The head A and cross-plate $a^9$ are reciprocated by means of the rods F, crank $f$, crank-rod $f'$, cross-bar $f^2$, and connecting mechanism, substantially as described in the patents above referred to. The springs $f^3$ not only serve to operate and to assist in returning the head to its normal condition, but hold it in an elevated position while the machine is at rest or in its normal position; and it may be said here that this is the principal object of the springs. Instead of the stop-motion provided in said Letters Patent, I use one which is quite similar in construction, but somewhat different in detail. It comprises a block $f^4$, which is arranged to slide in ways to a position between the end of the swinging connecting-rod $f'$ and the cross-bar $f^2$. These ways are supported by the cross-piece $f^2$, and when the block is inserted or forced in between the end of the swinging arm $f'$, which is constantly reciprocating and is guided by means of pins $f^5$ in the guides $f^6$, a connection between the swinging or reciprocating arm and the cross-bar is established, which practically makes the block a continuation of the swinging arm and transmits its motion to the cross-bar $f^2$, driving it down with the downward movement of the rod $f'$, and the guide $f^6$ being attached to the cross-bar $f^2$, the upward movement of the rod $f'$ brings the guide pins $f^5$ in contact with the upper portion of the guide, and serves to draw it back to its original position.

The block $f^4$ is held in position by the friction and pressure of the end of the rod $f'$ upon it; but upon the upward movement of the rod $f'$ this is released, and the coiled spring $f^7$ withdraws the block from underneath the arm, so that upon the second revolution of the crank, the block not being in place beneath the rod, it simply falls and lifts without operating to reciprocate the cross-bar $f^2$. The block $f^4$ is operated or pushed into position between the end of the reciprocating rod $f'$ and the cross-bar $f^2$ by means of the pawl $f^8$, which has a shoulder, $f^9$, and extension $f^{10}$, substantially as shown in Fig. 2, and which engages with the pin or arm $f^{11}$, as therein represented, the bell-crank lever $f^{12}$, which is pivoted at $f^{13}$ to the frame of the machine, and is connected at its upper end with the pawl $f^8$, which is pivoted thereto, and at its end $f^{14}$ with the treadle $f^{15}$, which is pivoted at $f^{16}$. A spring, $f^{17}$, serves to keep and return the treadle to an elevated or normal position.

Upon the downward movement it will be observed that the operation of this device is as follows: The operator places his foot upon the treadle, depresses it, and causes it to actuate the bell-crank lever, which, moving upon its pivot, throws or moves the pawl $f^8$ forward, thereby causing the block $f^4$ to be moved into position between the rod $f'$ and the cross-bar $f^2$. Of course this movement can only take place when the rod is in its highest position. This inward movement of the pawl $f^8$ not only pushes the block $f^4$ into position, but brings the end of the pawl in position over an arm or rest, $f^{18}$, which holds it while the block $f^4$ is being pushed downwardly, and thereby disengages the pawl from the pin $f^9$. If the treadle is held down, the pawl is pushed in, and the block, rising, brings the pin $f^9$ under the lower portion of the pawl, so that it does not engage the shoulder thereon, but permits the block $f^4$ to be drawn back by the spring $f^7$ to its normal position, and before it can be again moved forward the pawl $f^8$ must be returned to its original position in order that it may engage with the pin; consequently the machine makes but one revolution, and it cannot be again started until the treadle has been permitted to be returned to its normal position.

Any known equivalent for the mechanism herein described for reciprocating the cross-head may be used.

I do not confine myself to the stop-motion mechanism herein specified, but may use either in connection with the other parts of the actuating mechanism herein specified, a stop-motion of different construction—for instance, a clutch which shall operate upon the main shaft or upon one of the counter-shafts, such, for instance, as described in Letters Patent No. 251,756—without departing from the spirit of the invention.

The stand C is best shown in Figs. 2, 3, and 4. It comprises a bracket or post, $c$, which is fastened to the bed-plate $c'$ of the machine by bolts, and it is horizontally adjustable thereon, the bolts passing through slots in the bed-plate. These slots are holes in the bed-plate, through which the bolts which fasten the post $c$ to the table extend. If simply bolt-holes were made in the bed-plate, then the stand would not be movable thereon; but by making slots or enlarged bolt-holes then provision is supplied for the movement of the post $c$ upon the bed-plate $c'$ in the direction which the bolt-holes or slots will permit such movement, and in this case the bolt-holes or slots are so formed as to permit the movement of the post $c$ to and from the median central line of the machine. This construction is a very common one in a great many forms of machines, and in this case it is used for adjusting the horizontal position of the post in relation to said median central line, in order that the operative parts which it carries may be properly adjusted in relation to the various devices with which they co-operate. To make this adjustment it will be necessary to loosen the nuts upon the bolts, move the post by hand to the desired new position, and then tighten the nuts. As the construction is so old and so well known, I have not deemed it necessary to represent it in the drawings.

Upon the post or bracket is arranged the table $c^2$. This table supports the templet-plate $c^3$ and nail-holder plate $c^4$, and it has a vertical cavity or recess, $c^5$, of the size of the post $c$, upon which it fits, and it envelops three sides of the support of bracket, and is fastened thereon upon the other side by means of the plates $c^6$, which are bolted to the side portion of the table. It has also a horizontal recess, in which the templet and nail-holder plates are supported. Preferably the lower surface of this horizontal recess has a narrow recess, $c^7$, (represented in Fig. 4,) into which the lug $c^8$ in the templet-plate projects.

The narrow recess $c^7$ is formed in the upper surface of the table $c^2$ in the act of casting. It extends somewhat more than half way across it from its rear end, and it is of sufficient width to admit a stop or lug, $c^8$, which projects down from the templet-plate. The object of the recess is to provide, in connection with the lug $c^8$, a stop for limiting the forward movement of the templet and to permit the templet to be moved out of operative position by providing a space in which the lug or stop can be reciprocated.

The post $c$ has a vertical hole or recess, $c^9$, for holding the coiled spring $c^{10}$, which bears at its upper end against the table $c^2$, and serves to elevate it to its highest position. This spring is placed in relation to the table so as to cause as little binding action as possible upon the various parts in its downward and upward movements.

The post $c$ has upon its open or uncovered side the rib or abutment $c^{11}$, which is cast with it, and which extends from the top, or very near the top, to the bottom, and stiffens and strengthens it. The templet-plate preferably has the downward extension or stop $c^{12}$, which, in connection with the bolt or stop $c^{13}$ on the stand, limits the extent of its movement upon the table. This projection $c^{12}$, however, may not extend below the line of the projection $c^3$, although the construction is superior when it does, because it strikes against a more solid bearing. The stop $c^{13}$ has a slot, $c^{14}$, and it is fastened to the table by the screw $c^{15}$. When it is desired to remove the templet-plate from the table, the screw $c^{15}$ is turned and the stop $c^{13}$ falls thereon sufficiently to allow the table to be withdrawn.

The templet $C'$ is made in one piece with the templet plate—that is, it is not removable therefrom, but is solid or integral therewith—and the nail holder $C^2$ is also integral with its supporting sliding plate $c^4$. The templet-plate is of the same thickness throughout. The nail-holder plate is made thicker upon the end comprising the nail-holder. This nail-holder plate has the slot $c^{16}$ formed therein, and it, in connection with the handle and stop $c^{17}$, which extends through the slot and screws into the templet-plate, regulates the extent of the movement of the nail-holder plate. The nail holder plate also has a projection, $c^{18}$, from which extends the handle or knob $c^{19}$, and in this respect is like the construction shown in my Patent No. 259,687. The templet and nail-holder plates are preferably held in place by side plates, $c^{20}$, bolted or otherwise fastened to the table, and the nail-holder plate slides upon the templet-plate, and is held in place by the overlapping portions $c^{21}$ of the plates $c^{20}$. By making the nailholder a portion of the nail-plate and the templet a part of the templet-plate, and arranging them as shown, adjustments for varying sizes may be very easily made, because all that is necessary to effect a change is to take out the templet-plate and nail-plate, which are secured together by the stud $c^{17}$, from the table, and insert in lieu a templet-plate and nail-holder plate having a templet and nail-holder of the size desired.

The templet is locked when it is in position under the awls and drivers, and when in its normal position, by means of the spring-latch $c^{22}$. This spring-latch comprises a flat spring, which is fastened at one end to the side of the table, and has a conical or other shaped projection, $c^{23}$, at or near its end $c^{24}$, which enters the hole $c^{25}$ in the side of the table, and is adapted to engage with notches $c^{26}$ in the templet-plate. A spring-latch, $a^5$, of like construction, serves to engage with notches in the nail-holder-plate and lock it when pushed to feed nails in or pulled back to receive them.

The table has a vertical movement upon the post $c$ in opposition to the stress of the spring $c^{10}$, and it is moved downwardly, preferably, upon the forming of the perforations in the heel-blank by the awls upon the contact of the awl-holding block therewith, the awls entering the holes in the templet and the heel-blank until their supporting-block comes in contact with the upper surface of the templet, when they all descend, compressing the heel-blank upon the jack or heel-support.

When the table is in its lowest position, the latch $c^{27}$ engages with the catch $c^{28}$, fastened to the post $c$. (See Fig. 3.)

The latch consists of a spring-arm, $c^{29}$, which is fastened at $c^{30}$ to the table, and has at its lower end a projection which is inclined and forms a notch or shoulder, so that upon the downward movement thereof it rides over the catch $c^{28}$, and then closes upon it, after the end has cleared its under surface. The table may also be moved down by hand by means of the lever $c^{31}$, pivoted to the post $c$ at $c^{32}$, and link $c^{33}$, which is pivoted to the table at $c^{34}$ and to the link at $c^{35}$.

The lever $c^{36}$, which is pivoted at $c^{37}$ to the post $c$, and extends backwardly therefrom, serves to disengage the latch $c^{27}$ from the catch $c^{28}$ upon being depressed, and its end coming in contact with the inclined end of the latch and throwing it outward from the catch. A spring, $c^{38}$, holds the lever in proper position. A stop, $c^{45}$, limits the extent of upward movement of the table.

As I have already stated, the table $c^2$ has a vertical movement. It is moved downwardly upon the contact of the awl-block therewith in the act of driving the awls, and as it is necessary that it should be returned to its original position after the nails have been driven, a spring has been employed, as above indicated, to so return it upon the release of the latch $c^{27}$, which locks it in its depressed position. It is necessary to have a spring of considerable power; and in order that the spring, upon the release of the latch $c^{27}$, may not move the table to a higher position than is desirable, the table is provided with the slot which is clearly shown in Fig. 3, through which the stop $c^{45}$, which is secured to the post $c$, extends, and the extent of upward movement of the table is controlled by the length of this slot, as upon the release of the latch the table moves upwardly until the under surface of the slot comes in contact with the stop $c^{45}$.

The nail-holder plate has a circular recess, $c^{39}$, (see Figs. 4 and 12,) formed in its under surface under the nail-holder, and also a recess $c^{40}$, for a stud. Into this recess $c^{39}$ is placed a circular plate, $c^{41}$, which is fastened to the stud in the recess $c^{40}$, so as to be capable of revolution, and it is perforated so as to correspond with the holes in the nail-holder. A plan view of the nail-holder plate inverted is shown in Fig. 12. The plate has a projection, $c^{42}$, which projects into the groove or recess $c^{43}$ in the under portion of the nail-plate. The templet-plate has two pins, $c^{44}$, one of which is shown in Fig. 7, and the other of which is covered by the nail-holder plate, and when the templet and nail-holder plates bear the relation to each other shown in Fig. 7 the back pin, which projects into the recess $c^{43}$, is very near the front end of said recess, and it is against these two pins this projection $c^{42}$ comes in contact in the movement of the nail-holder plate on the templet-plate. In the onward movement of said nail-holder plate this contact with the stop or pin $c^{44}$ turns the plate $c^{41}$, sufficiently to cause the holes therein to register with the holes in the nail-holder and templet, and upon the reverse movement of the nail-holder plate upon the templet-plate the projection $c^{42}$ comes in contact with the back stop, $c^{44}$, and causes the plate to be revolved sufficiently to bring the perforations out of line with the perforations of the nail-holder plate, thereby closing the same.

The under surface of the templet may be made somewhat concave in order that the pressure upon the heel-blank may be greater about the edge of the heel-blank than at the center, and also to crown, as it were, the top lift of the heel-blank, or so shape the edge in relation to the central portion as to cause it to be inclined or rounded in relation thereto, in order that the entire surface of the lift may be uniformly presented to the polishing or scouring machine.

The shoe-centering and heel-blank-holding devices are well shown in Figs. 3, 4, 7, 10, and 11. The shoe-centering device consists of two independent guide-plates, $e$, arranged opposite each other, and each fastened to a lever, $e'$, which is pivoted at $e^2$ (see Figs. 1 and 5) to a plate, $e^3$, which is fastened to a carriage, $e^4$, (see Fig. 4,) by means of a screw, $e^5$. This plate $e^3$ has a slot, $e^6$, and it rests upon the lifting-screw $e^7$, which is carried by the plate $e^4$, so that to vertically adjust the plate $e^3$ and the devices it carries it is simply necessary to loosen the screw $e^5$ and raise or depress the screw $e^7$.

The levers $e'$ preferably are connected with each other by means of a right-and-left screw or worm, $e^8$, which is held to the plate $e^3$ by a collar, $E'$, which enters a recess therein, or in any desirable way, and passes through nuts $e^9$, bolted or otherwise fastened to the levers $e'$. By turning this worm or screw it is obvious that the levers $e'$ may be moved to or from each other. The inner edge of the plates $e$ is made thin and rounded, is preferably very nearly straight, and is adapted to enter the space between the upper and the outsole as the shoe or boot is moved into position, and thereby center it or assist in centering it in relation to the other parts of the machine. In addition, each guide-plate $e$ may have a downwardly-projecting guide $e^{10}$, which is back from the edge of the plate, is preferably somewhat curved or rounded or outwardly inclined upon its contacting surface, and which is adapted to center or assist in centering the boot or shoe by coming in contact with the side of the heel of the boot or shoe immediately below the sole when the shoe is reversed. The shape of these guides $e^{10}$ is very well shown in Figs. 7 and 11. When these under guides, $e^{10}$, are used the guide-plates $e$ serve to locate the under guides in proper position by entering the space between the outsole and upper, and it may be said in this connection that the guide-plates $e$ may be used for this purpose only, if desired.

As the insole, upper-leather, and counter of the heel portion of the boot or shoe are somewhat compressed by the attaching of the heel, it is necessary that either the guide-plates $e$ should be spring-arms, so that they may yield downwardly, or that the levers $e'$ or other supports be mounted on springs which will permit of a slight downward movement. The heel-blank-centering device comprises the arms $e^{11}$. These arms extend downwardly from above the guides $e$ to the vertical posts or supports $e^{12}$, which may be integral with the sides or separate therefrom, as desired. Each of these supports $e^{12}$ in the drawings is shown integral with the arms $e^{11}$, and is fastened at its lower end to the lever $e'$, and if it is a spring or yielding arm, as represented in the drawings, it may be made adjustable to and from the lever $e'$ by means of the screw $e^{13}$, or it may be supported by a carriage which shall be carried by the lever $e'$ or other suitable support, and provided with an adjustment by means of a screw, or in any other way in relation to the guides $e$. When supported by the levers $e'$, the guides $e^{11}$ are provided with horizontal movement with the side guides, $e$, by means of the screw $e^8$. It is desirable that the arms $e^{11}$ be adapted to spring or yield laterally to some extent in order to accommodate heels of varying widths. If they do not so yield, it would be necessary to set them up or move them out for almost every heel-blank attached. The front ends, $e^{14}$, of the arms are curved outwardly to act as guides in assisting in the placing of the heel.

The plate $e^3$ carries at its upper end a back stop, $e^{15}$, (see Fig. 6,) which is curved upon its contacting face $e^{16}$, and has an arm or spindle, $e^{17}$, which enters a hole in the said plate $e^3$, and by means of a set-screw the horizontal position of this stop in relation to the plate is varied.

The entire shoe-centering and heel-centering devices are adjusted horizontally by means of a carriage, $e^4$, which is supported by the post $c$, being arranged to slide in a recess of corresponding shape formed therein, and this carriage is moved or adjusted by means of the adjusting-screw $e^{18}$ and the locking-nut $e^{19}$, (shown in Fig. 1,) the nut screwing upon a screw-stud, $e^{20}$, (shown in Figs. 3 and 14,) which is fastened to the post $c$ and passes through a slot, $e^{21}$, in the carriage $e^4$. To adjust the carriage or plate, the nut $e^{19}$ is unscrewed and the adjusting-screw $e^{18}$ turned until the carriage or plate $e^4$ is moved sufficiently to properly adjust the shoe and heel devices, when the nut is tightened, and the carriage is locked in that position. The screw $e^{18}$ passes through a slot in the plate $e^4$, (see Fig. 14,) is fastened thereto by a collar, and screws into the post $c$. It will be observed that this shoe-centering and heel-centering mechanism consists, essentially, of two parts—namely, the boot or shoe centering devices and the heel-blank-centering devices. The shoe-centering devices comprise two parts, which are independently adjustable in relation to each other and to the jack and templet. One part comprises the side guides, which are yielding arms that enter the crease between the outsole and upper-leather, and may bear against the side surface thereof in addition, which guides are preferably adjustable horizontally in relation to each other from a central point, and the back stop, against which the back of the heel comes in contact, and which is adjustable horizontally to and from the guides. The heel-blank guides are preferably spring-arms, which are adjustable horizontally independently of the boot or shoe side guides. In addition to these adjustments, the boot or shoe and heel guides have a vertical adjustment in relation to the jack and templet and in relation to the carriage $e^4$ and post $c$, and also a horizontal adjustment in relation to the jack, templet, and post $c$.

It will be noticed, also, that the heel-blank guides are separate from the back stop, and that they have an independent horizontal adjustment in relation to each other. By this arrangement of centering devices I am enabled not only to accurately locate the boot or shoe upon the jack in the proper place relatively to the templet, but I am also enabled to properly locate the heel-blank thereon, and also to make adjustments, so that with the one set of devices I can properly center and locate all sizes of boots and shoes and heel-blanks that may be used in relation to the templet.

The top-lift spanker and holder G are shown in Figs. 1, 2, 5, and 8, and they comprise a block, $g$, having a dovetail recess, $g'$, which fits a dovetail upon the arm $a^4$, and is horizontally adjustable thereon, and the spring-arms $g^2$, which are curved substantially as shown in Fig. 8, have the outwardly-projecting or curved end $g^3$, and are fastened to blocks $g^4$ by means of screws, or by riveting, or in any other desirable way. These blocks $g^4$ have downwardly-projecting portions $g^5$, which enter the recess $g^6$ at the front of the block G, and are provided with screw-holes $g^7$, for the right-and-left screw or worm $g^8$, which moves the blocks $g^4$ to and from each other and adjusts the spring-arms $g^2$ to the size of the top-lift used. The blocks $g^4$ are formed with the surface or shoulder $g^9$, against which the front of the heel-blank comes in contact, and they form a stop or guide therefor, and the portion $g^{10}$ is rounded upon its inner surface to act as a guide in properly placing the blank in position. The heel-blank is held to the surface of the block and against the portions or slopes $g^9$ by the pressure of the spring-arms upon the side and back edge thereof.

It is desirable that the ends $g^3$ of the spring-arms $g^2$ be curved or bent outwardly, as represented in Fig. 8, in order that the top lift may be guided between the arms into position, and these outwardly-extending ends $g^3$ serve as guides in directing this placing of the top-lift. This construction is especially desirable when the top-lift holder cannot be seen by the operator, as he then relies upon the touch simply in placing the lift in proper position. And when the arms are provided with these outwardly-extending guides or ends the blank is placed upon or held against the spanker-block G between them, and then pressed inwardly, spreading the outer portion of the arms $g^2$ sufficiently to allow the blank to pass by the inwardly-curved portions of the arm, and the arms, springing back, seize or press against the edge of the lift and hold it firmly against the stop or shoulder $g^9$. Of course the arms $g^2$ may be used without the outwardly-extending ends, if desired; but under ordinary circumstances the shape shown and described is the best.

The surface of the block to which the spring-arms are attached and upon which they are movable must be smooth and without holes upon that portion against which the upper surface of the top lift comes in contact, in order that it may act as a spanker in spanking on the top lift. It preferably should be made concave, as represented in Fig. 17, in order that the edge of the top lift be depressed more than the central portion.

In Fig. 16 I show a heel blank-centering device which has, in addition to the lateral yielding movement above described, a vertical yielding movement. This is accomplished by making the supporting-arms horizontal spring-plates, and by shaping the guides as represented they each can be formed from a flat strip or plate of metal.

In the construction shown in said figure both the side guide-plate, $e$, and the heel-blank-guide-supporting plate are fastened to the lever $e'$ by one screw, and by slotting the upper or blank-guide-supporting plate it may be adjusted horizontally in relation to the side guide-plate, $e$. As the heel-blank is considerably compressed, and as there is some liability of the blank-guide being caught by the blank and broken, it is of some importance that they be given provision for yielding downward with the blank.

The jack B is like that in the Letters Patent referred to above.

The machine is intended to be worked by an operator and an attendant. The operator stands at the front of the machine, places the boot or shoe upon the heel form or support, and moves it into the centering device, which adjusts the boot or shoe upon the heel support or rest. He then places the heel-blank between the blank-centering arms, and the attendant moves the templet into position over the blank. The machine is then put in operation, and the awls are moved through the templet-plate and driven into the heel. The awl-holding block comes in contact with the templet-plate and moves it and the table $c^2$ downwardly, thereby compressing the heel-blank, while at the same time the holes are formed therein and the carriage is locked automatically in its lowest or very nearly its lowest position. The awls then lift the templet holding the blank compressed, and the operator moves the head sufficiently to bring the drivers into operative position, and the attendant, who has filled the nail-holder with nails in this interval, moves it forward over the templet-plate and heel-blank, and the nails are discharged therefrom into the holes of the templet and heel. The machine is again set in motion, and the drivers, entering the nail-holder and templet, drive the nails entirely or almost through the templet into the heel and clinch their points upon the heel form or rest. If a top lift is to be applied, the ends of the nails are left protruding from the blank slightly. The next step is to withdraw the nail-holder and templet-plate, which is done by the attendant, and move the top-lift holder and spanker into operative position, which is done by the operator, and the top-lift holder, which has been supplied with a top lift by the attendant, is then reciprocated, as the awls and drivers have been, and is spanked upon the heel-blank. The jack is then withdrawn, the boot or shoe removed, and the operation continued as before.

I am aware that the Patent No. 103,735, granted to Glidden, shows and describes a means for suspending a last in an operative position, and a clamping device or rim which co-operates with said means for holding the last in supporting the boot or shoe; but I consider that this method of supporting and locating the work does not contain the essential elements of this portion of my invention, because I do not suspend the last supporting my work, and do not use a clamping device like that described in said patent, and I present my work in an inverted position to the operative devices of the machine, whereby the operator can more easily place in position the work and locate the heel-blank, and it is always under his observation during the operation of the machine.

It is obvious that the machine we have described may be used without the awls, drivers, or spanker, if so desired—that is, the awls alone may be used, or the drivers and awls, or the spanker and awls, or the awls and drivers only, or the drivers and spanker, or awls and spanker, according as the work to be done may require one or more of the operations performed by these parts.

Having thus fully described my invention, I claim and desire to secure by Letters Patent of the United States—

1. In a heel-nailing machine, the revolving head having three arms which support, respectively, the awls, drivers, and spanker and top-lift holder, two of which arms are opposite or in line with each other, and the third projects at a right angle thereto, whereby the drivers and spanker and holder are adapted to be brought successively into operative position by a quarter-revolution of the head, and the spanker and holder adapted to be locked in their highest position to receive the top lift, all substantially as described.

2. The combination, in a heel-nailing machine, of the revolving head A, having arms $a\ a^2\ a^4$, arranged to project therefrom, the disk $a^{10}$, notched as described, and the horizontal spring-bolt $a^{13}$, all substantially as and for the purposes set forth.

3. The combination of the spanker-block G and the top-lift grasping and gaging devices $g^2\ g^4$, all substantially as and for the purposes described.

4. The combination of the top lift block or spanker G with the blocks $g^4$, carrying the top-lift-grasping devices, and the right-and-left screw $g^8$, for moving the blocks to and from each other, all substantially as and for the purposes described.

5. The combination of the spanker G, the blocks $g^4$, having the shoulders or stops $g^9$, and yielding arms $g^2$, all substantially as and for the purposes set forth.

6. The combination of the block G and means for adjusting it laterally upon its supporting-arms $a^4$, and the top-lift-holding device upon the under surface of said block G, and fastened thereto, all substantially as and for the purposes described.

7. In a heel-nailing machine, the top lift spanker having its operative surface made slightly concave, or shaped to consolidate the top lift or upper surface of the heel-blank from or near the center to the edge, in combination with a reciprocating cross-head and a jack, and adapted to be operated after the driving of the gang of attaching-nails, all substantially as and for the purposes described.

8. The combination of the post or bracket $c$, shaped substantially as indicated, and the tablet $c^2$, shaped as described, and fastened to the post, as set forth.

9. In a heel-nailing machine, the combination of the post $c$, having the spring-holding recess $c^9$, with the table $c^2$, having downwardly-extending portions for embracing one side and two ends of the post, the plates $c^6$, and the spring $c^{10}$, all substantially as described.

10. The combination of the table $c^2$, having the recess $c^7$, with the templet-plate $c^3$, having the lug or stop $c^8$, which enters said recess, all substantially as and for the purposes describd.

11. The combination of the table $c^2$, having the recess $c^7$, with the templet-plate $c^3$, having the downwardly-projecting portion $c^{12}$ and the sliding stop $c^{13}$, all substantially as and for the purposes described.

12. The combination of the nail-holder plate $c^4$, having the recess $c^{43}$, the nail-holder $c^2$, the revolving plate $c^{41}$, the templet-plate $c^3$, and the pins $c^{44}$, all substantially as and for the purposes described.

13. The combination of the templet-plate having the side notches, $c^{26}$, with the spring-arm $c^{22}$, having the latch or bolt $c^{23}$, which is adapted to enter the said notches through a hole in the side of the table, all substantially as and for the purposes described.

14. In a heel-nailing machine, the combination of a heel-support adapted to hold the boot or shoe in an inverted position, and to be moved horizontally below the downwardly-yielding side guide-plates, $e$, with said downwardly-yielding side guide-plates, $e$, all substantially as and for the purposes described.

15. In a heel-nailing machine, the centering devices for controlling the position of the boot or shoe in relation to the templet C′, consisting of two independent vertically-yielding plates $e$, the guiding-edges of which are adapted to enter the grooves or crease between the outsole and upper-leather of the boot or shoe, all substantially as and for the purposes described.

16. In a heel-nailing machine, the combination of a support for a boot or shoe adapted to be moved horizontally beneath the shoe-centering devices, the said shoe-centering devices consisting of the yielding side guides, $e$, and the upper-leather or counter guides $e^{10}$, attached to the under surface of said side guides, all substantially as and for the purposes described.

17. In a heel-nailing machine, the combination of a support for the heel of a boot or shoe, the yielding side guides, $e$, and means for adjusting them laterally independent of each other and in relation to the heel-support, all substantially as and for the purposes described.

18. In a heel-nailing machine, the combination of the side guides or guide-plates, $e$, the supporting-arms $e'$, pivoted at $e^2$, and the right-and-left screw $e^8$, all substantially as and for the purposes described.

19. In a heel-nailing machine, as a means for locating the heel-blank, the plates or guides $e^{11}$, arranged in relation to each other and adapted to locate the heel-blank upon the sole of a boot or shoe by contact with its edge or sides, all substantially as and for the purposes described.

20. In a heel-nailing machine, the combination of the heel-blank guides $e^{11}$ and their supports, and means for moving them horizontally to and from each other, all substantially as and for the purposes described.

21. The combination, in a heel-nailing machine, of the heel-blank guides $e^{11}$, their supports $e'$, and adjusting-screws $e^{13}$, whereby the guides may be independently adjusted horizontally in relation to each other, all substantially as and for the purposes described.

22. In a heel-nailing machine, the combination of a boot or shoe centering device $e$, the heel-blank guides $e^{11}$, their supports $e'$, and the right-and-left screw $e^8$, for horizontally adjusting the centering device and heel-blank guides simultaneously, all substantially as and for the purposes described.

23. The heel-blank guides $e^{11}$, having the long spring-arms $e^{12}$, fastened to suitable supports, all substantially as and for the purposes described.

24. In a heel-nailing machine, the combination of the side guides or guide-plates, $e$, with the independent adjustable back-stop $e^{15}$, all substantially as and for the purposes described.

25. In a heel-nailing machine, the combination of a support for the heel of the boot or shoe, the side guides or guide plates, $e$, back stop, $e^{15}$, and heel-blank guides $e^{11}$, all substantially as and for the purposes described.

26. In a heel-nailing machine, the combination of a support or jack for a heel of a boot or shoe adapted to have a horizontal movement imparted to it below the vertically-yielding side guides, and the said vertically-yielding side guides, and means, substantially as described, for moving them vertically relatively to said support or jack for the purpose of adjustment, all substantially as and for the purposes described.

27. In a heel-nailing machine, the combination of a support for the heel of a boot or shoe, the heel-blank guides $e^{11}$, and means, substantially as described, for moving them vertically in relation to said heel-support for the purposes of adjustment, all substantially as and for the purposes described.

28. In a heel-nailing machine, the combination of a jack or support for a boot or shoe, adapted to be moved horizontally to and from a back stop, $e^{15}$, with the means described for moving said stop vertically in relation to the said jack or heel-support, all substantially as and for the purposes described.

29. The combination of a support for the heel of a boot or shoe, the heel-blank guides $e^{11}$, and means for adjusting them horizontally lengthwise the heel-support or last, all substantially as and for the purposes described.

30. The combination of a support for the heel of a boot or shoe, the side guides, $e$, the heel-blank guides $e^{11}$, the back stop, $e^{15}$, and means, substantially as described, for adjusting them horizontally lengthwise the heel-support or last to and from the post $c$, all substantially as and for the purposes described.

31. The combination of the plate $e^3$, supporting the independent side guides, $e$, the heel-blank guides $e^{11}$, and the back stop, $e^{15}$, with the adjusting-screw $e^{17}$, and the locking-screw $e^5$, all substantially as and for the purposes described.

32. In a heel-nailing machine, the combination of the plate $e^3$, supporting the boot or shoe and heel-blank-centering devices, with the carriage $e^4$, screw $e^{18}$, and locking-nut $e^{19}$, all substantially as and for the purposes described.

33. In a heel-nailing machine, the combination of the post $c$ with the side guides, $e$, and connecting mechanism, substantially as described, whereby the guides are moved vertically and horizontally in relation to the post, all substantially as and for the purposes described.

34. The combination of the post $c$, the heel-blank guides $e^{11}$, and connecting mechanism, substantially as specified, whereby the guides are moved vertically and horizontally in relation to the post, all substantially as and for the purposes described.

35. In a heel-nailing machine, the combination of the post $c$, the back stop, $e^{15}$, and means, substantially as specified, for adjusting the back stop vertically and horizontally in relation to the post, all substantially as and for the purposes described.

36. In a heel-nailing machine, the combination of the templet $C'$, the downwardly-yielding side guides, $e$, and respective means, substantially as described, for adjusting the said guides horizontally in a lateral or longitudinal direction, or vertically beneath the templet, all substantially as and for the purposes described.

37. In a heel-nailing machine, the combination of the vertically-yielding side guides, $e$, and the templet $C'$, adapted to have a vertical movement imparted to it, all substantially as and for the purposes described.

38. The combination of the templet $C'$, the yielding heel-blank guides $e^{11}$, and the respective means, substantially as described, for moving them horizontally in a lateral direction, or lengthwise the templet, or for moving them vertically in relation thereto and beneath it, all substantially as and for the purposes described.

39. In an organized heel-nailing machine, the combination of a support for the boot or shoe, the yielding side guides $e$, the vertically-movable templet $C'$, and a gang or group of awls or a gang or group of drivers, and means for reciprocating said gang, all substantially as and for the purposes described.

40. In an organized heel-nailing machine, the combination of a support for the boot or shoe, the yielding side guides, $e$, the vertically movable templet $C'$, and the nail-holder $C^2$, and the gang or group of drivers adapted to be vertically reciprocated in relation to the templet, all substantially as and for the purposes described.

41. The combination of a support for the heel of a boot or shoe, the yielding side guides, $e$, the heel-blank guides $e^{11}$, the templet $C'$, adapted to be moved vertically, and a nail-holder, $C^2$, having a horizontal movement upon the templet-plate, with a gang or group of drivers and means for vertically moving them in relation to the heel-support, all substantially as and for the purposes described.

42. The combination of a support for the heel of a boot or shoe, the downwardly-yielding side guides, $e$, and the top-lift spanker, adapted to be reciprocated in relation to the heel-support, all substantially as and for the purposes described.

43. The combination of a support for the heel of a boot or shoe, the side guides, $e$, the downwardly-yielding heel-blank guides $e^{11}$, and the top-lift spanker and means for vertically reciprocating it in relation to the heel-support, all substantially as and for the purposes described.

44. In a heel-nailing machine, the combination of a support for the heel of a boot or shoe, the templet C', the gang or drivers and a concave heel-spanker, G, and means for reciprocating the said drivers and spanker successively, whereby a gang of nails is first driven through the heel-blank, and the blank then shaped upon its upper surface by the spanker, as described, all substantially as and for the purposes set forth.

45. In a heel-nailing machine, the combination of a support for the heel of a boot or shoe, the vertically-movable templet adapted to be forced upon the heel-blank to compress it, means for locking it at or near its lowest position, and the side guides, e, between the templet and heel-support when they are in operative position, all substantially as and for the purposes described.

HENRY A. HENDERSON.

Witnesses:
F. F. RAYMOND, 2d,
BOWDOIN S. PARKER.